Dec. 30, 1952  R. W. MORE  2,623,670
CONTAINER CASE
Filed Feb. 15, 1946  7 Sheets-Sheet 2

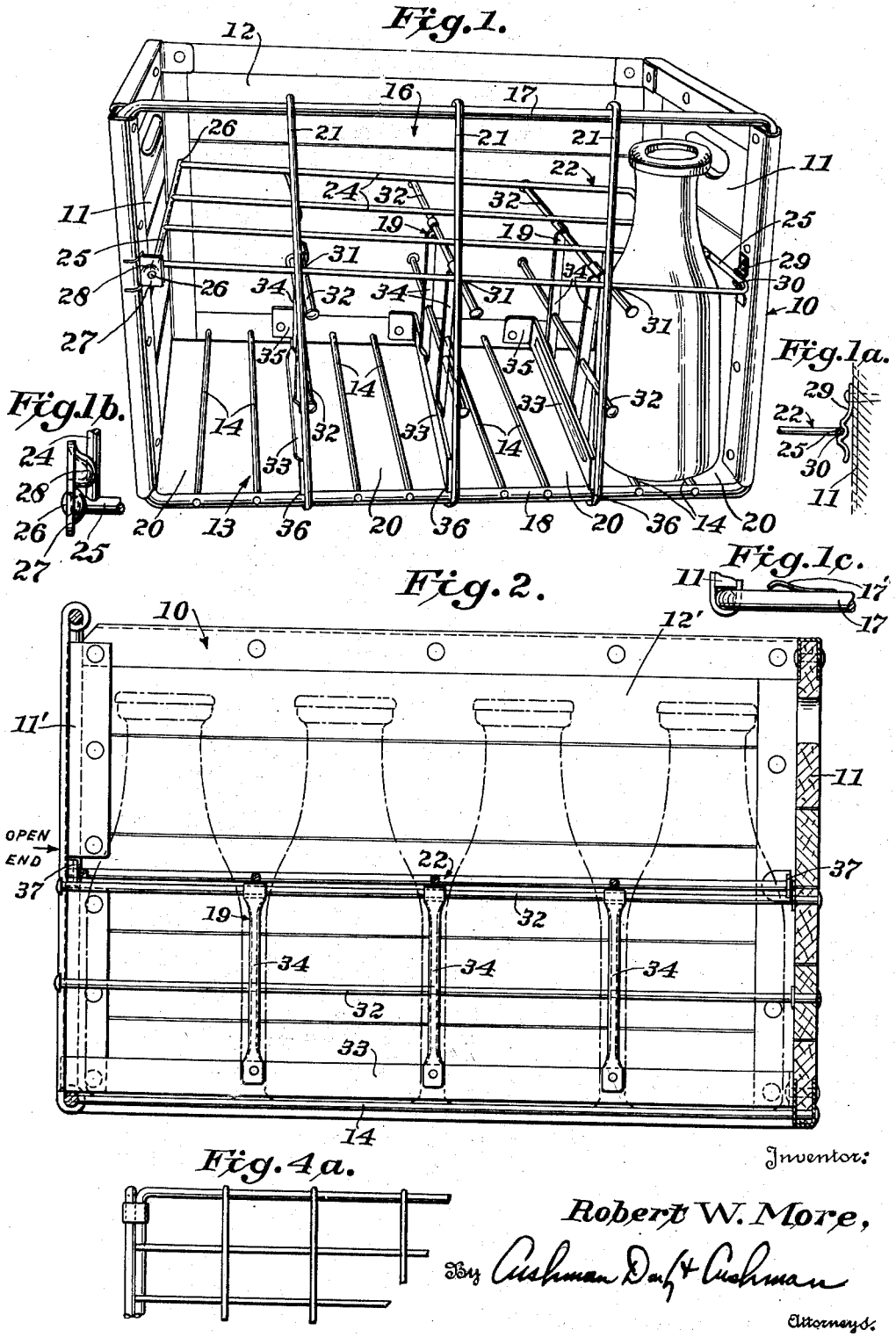

Inventor
Robert W. More,
By Cushman Darby & Cushman
Attorneys

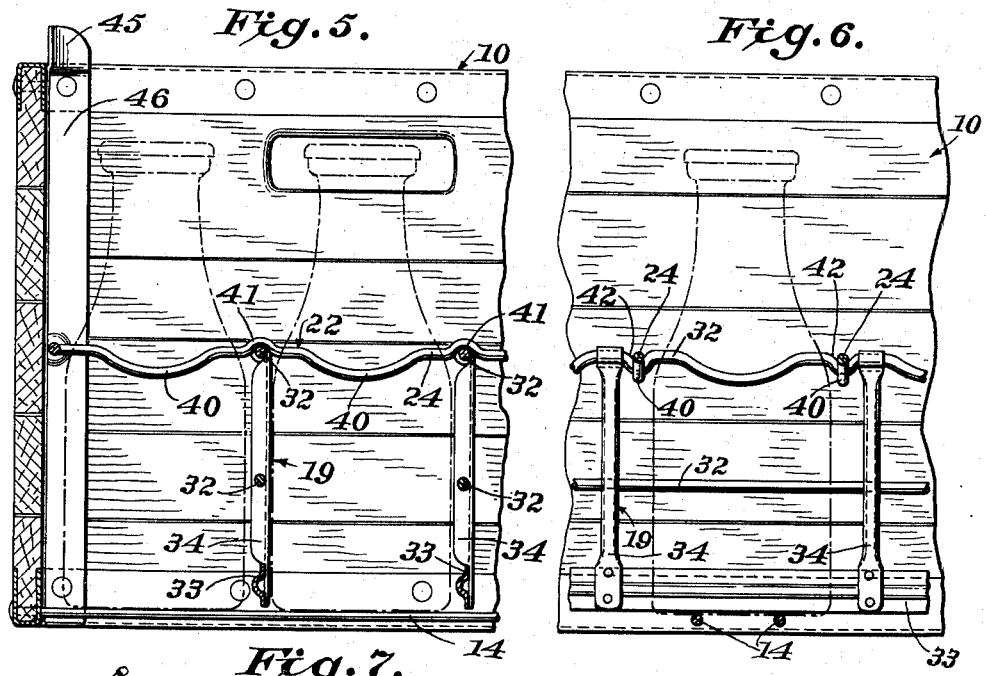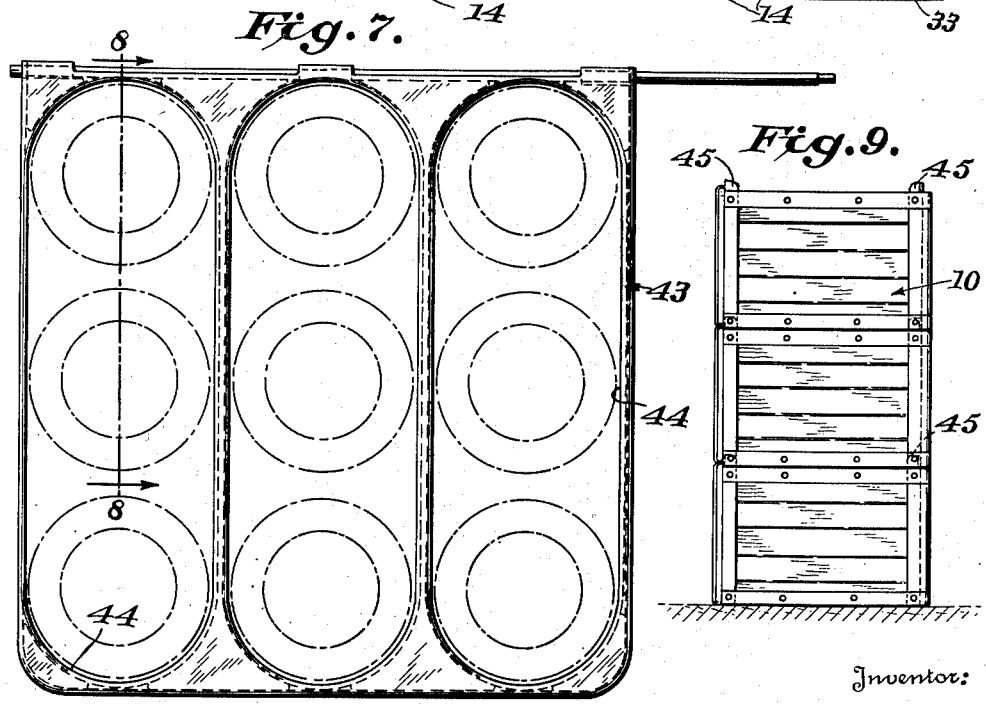

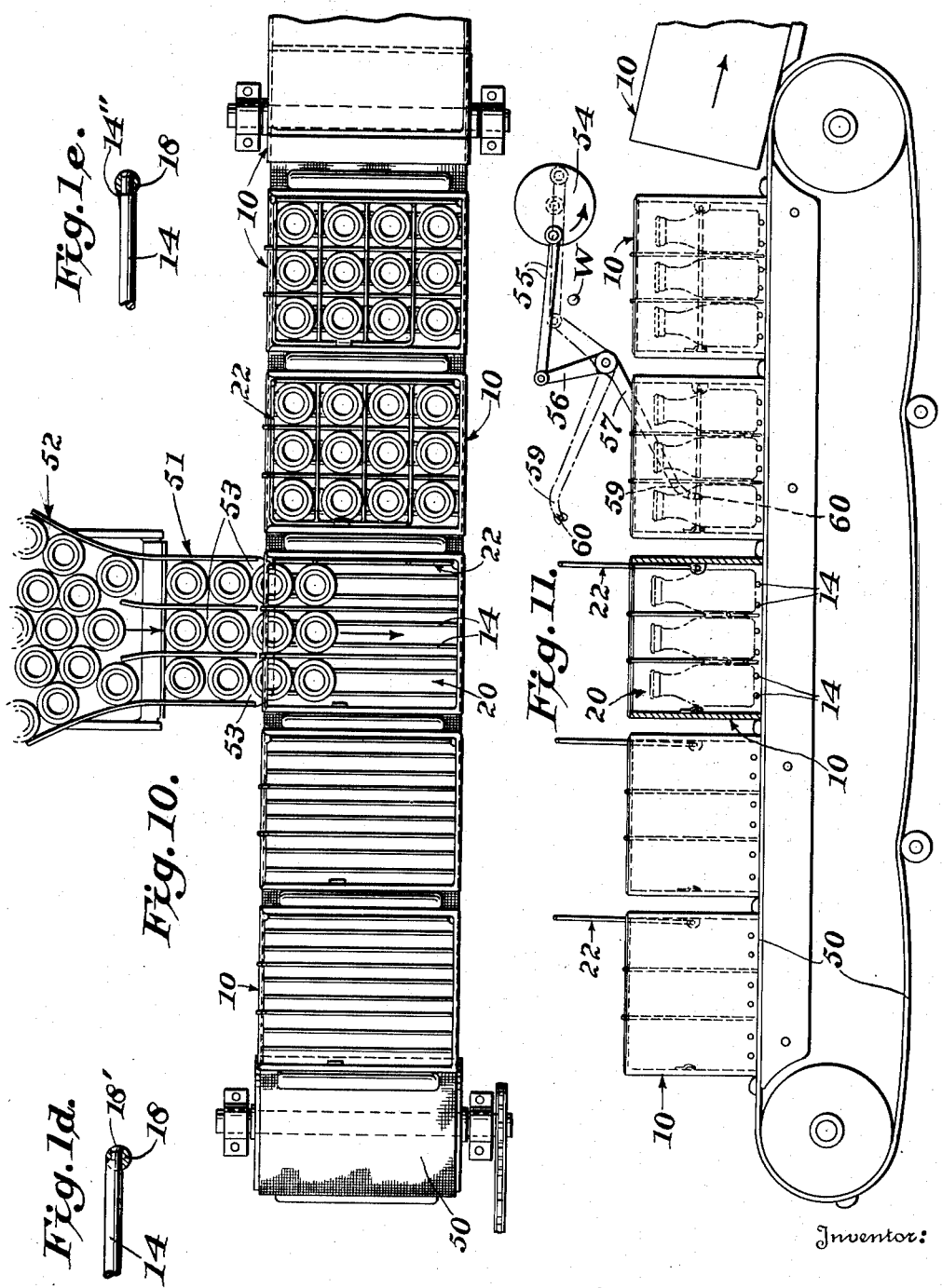

Dec. 30, 1952 R. W. MORE 2,623,670
CONTAINER CASE
Filed Feb. 15, 1946 7 Sheets-Sheet 5
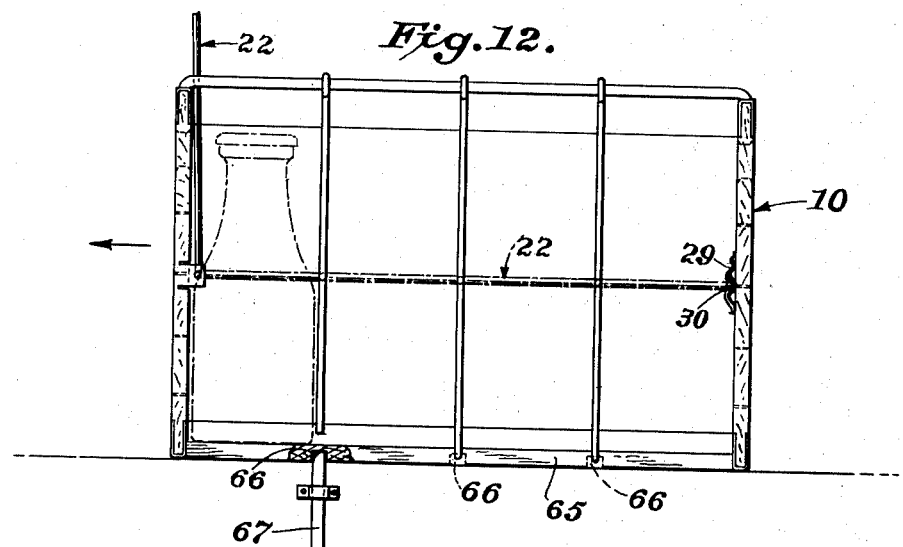
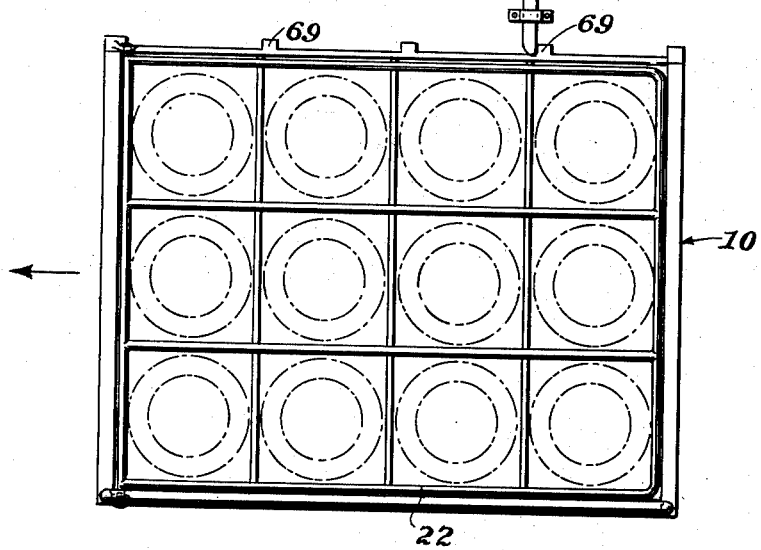
Inventor:
Robert W. More,
By Cushman Darby + Cushman
Attorneys.

Dec. 30, 1952 R. W. MORE 2,623,670
CONTAINER CASE
Filed Feb. 15, 1946 7 Sheets-Sheet 6
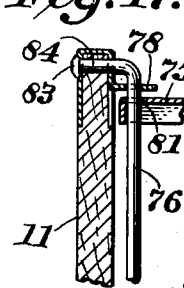
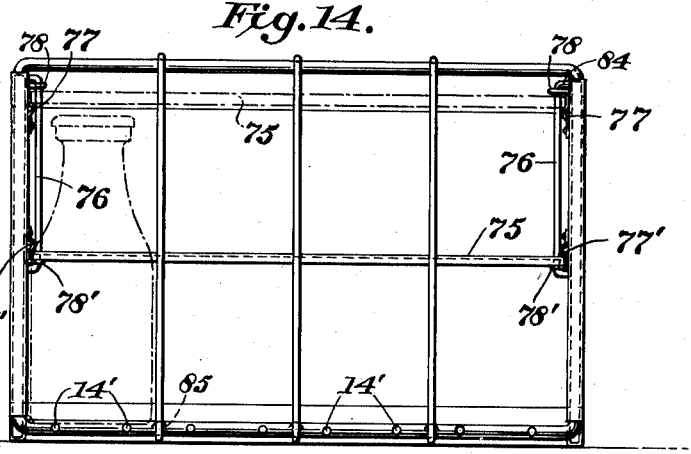
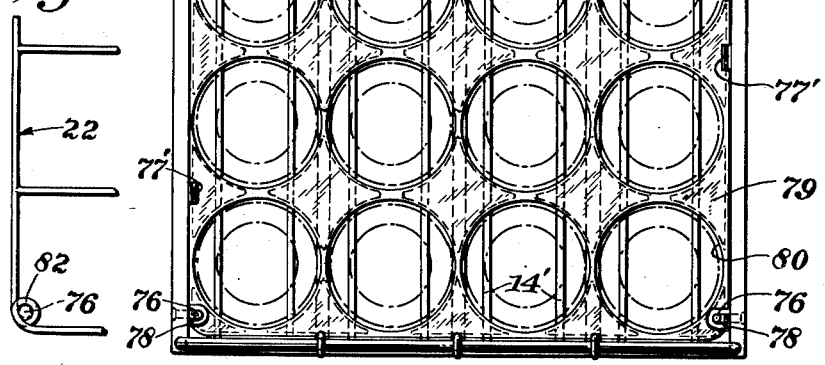
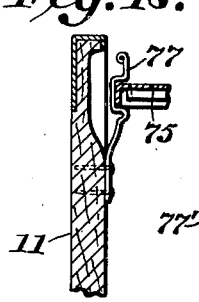
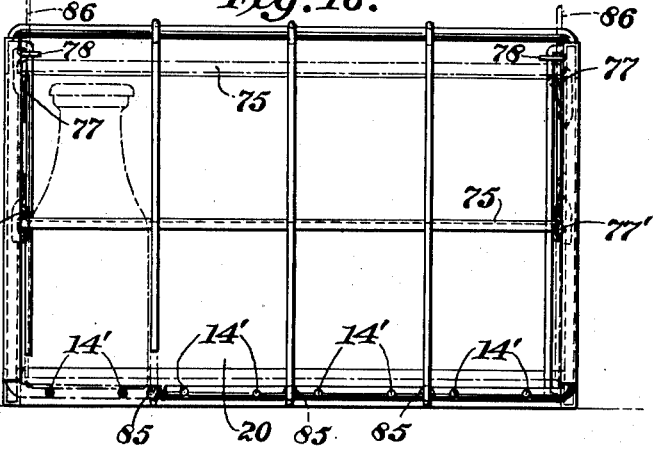
Inventor:
Robert W. More,
By Cushman Darby & Cushman
Attorneys.

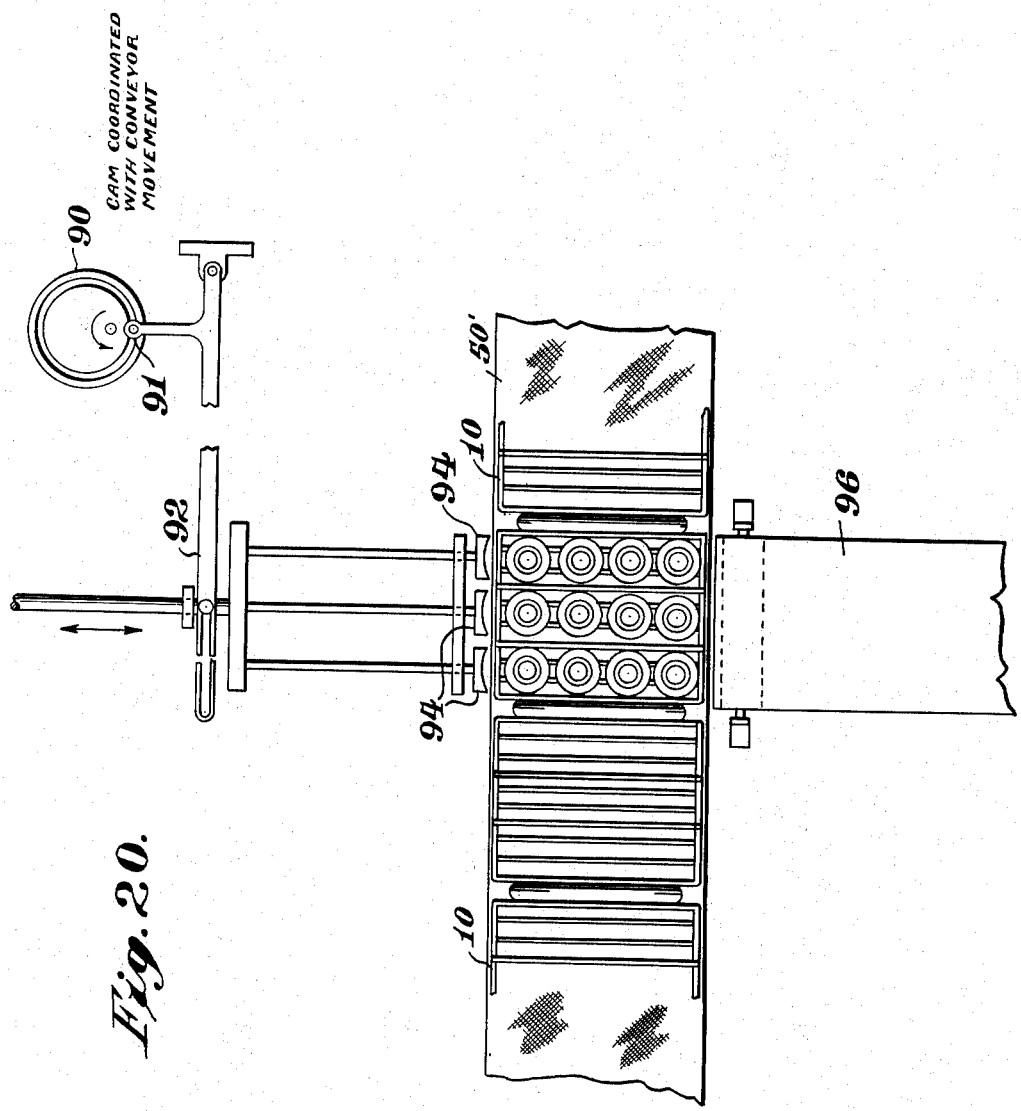

Patented Dec. 30, 1952

2,623,670

UNITED STATES PATENT OFFICE 2,623,670

CONTAINER CASE

Robert W. More, Chicago, Ill., assignor to Beatrice Creamery Company, Chicago, Ill., a corporation of Delaware Application February 15, 1946, Serial No. 647,813

7 Claims. (Cl. 226—14)

The present invention relates to cases for carrying numerous varieties of portable objects and particularly for casing glass, paper, plastic or metal containers of various shapes and sizes, notably milk bottles.

Customarily cases of the milk bottle and beverage bottle type employ fixed intersecting partitions which form individual bottle holding compartments with each other and with the walls of the case, each compartment having an open top. Such cases, therefore, are filled by manually or mechanically depositing containers into the individual compartments from the open top of the case, and the empty or used containers are moved for washing and sterilizing in the same manner, namely from the top of the case.

The case of the present invention is distinguished from such conventional carrying cases (1) by having an open side or end wall portion through which objects such as containers may be introduced to or removed from the case, and (2) by having an associated movably mounted partition member or divider for retaining the objects, introduced through such open wall portion, disposed in spaced relation and out of direct contact with each other while permitting ready withdrawal of the objects or containers from the open top of the case.

In one form of the invention, the case has a set of spaced fixed partitions each extending in one direction to the open side or end of the case thereby forming substantially parallel elongated compartments opening into said end or side, and an intersecting pivotally mounted partition structure extending in an opposite direction and at substantially right angles to the fixed partitions.

In another form of the invention, the partition structure is slidably mounted for vertical movement within the case and associated with the fixed partitions, as described, while in a further form of the invention, the fixed partitions may be omitted or substantially reduced in vertical dimension.

By raising the movably mounted partitions, containers or bottles may be readily fed from a bottling machine into the open side or end of the case, and in position to be engaged by the fixed partitions, e. g., the containers are disposed in the continuous elongated compartments formed by the fixed partitions alone and which open into the open end or side. Thereafter, the movably mounted partitions can be swung or slid into intersecting relation with the fixed partitions and locked into position to form with the fixed partitions individual container compartments.

Where fixed partitions are omitted, the movable partition structure will engage over and about the objects or containers and serve to hold them in suitable spaced relation.

Empty or return containers can be discharged from the case to a washing or sterilizing machine by raising the pivoted or slidable set of partitions and allowing the empties to pass out of the case, e. g., from the elongated compartments through the open side or end of the case.

The filling or emptying of a case can thus be accomplished continuously and automatically by a suitable conveyor arrangement on which the cases are mounted, and means are provided for assuring that the elongated compartments formed by the fixed partitions will register with container feeding means from the bottling apparatus or with receiving means associated with a bottle washing or sterilizing instrumentality.

The primary object of the invention is to provide a case, preferably constructed of metal, which will permit continuous, rapid and automatic feeding of various portable objects such as containers, e. g., glass milk bottles from a bottling machine into the case and the discharge of empty used bottles from the case to cleaning and sterilizing means.

Another object of the invention is to provide a case of light construction which may be used as a carrying case by vehicle delivery personnel.

A further object of the invention is to provide a case having considerable strength and rigidity to withstand the rough handling which cases of this character normally encounter in use.

An additional object of the invention is to provide a case which will preclude distortion of the containers by contact of one with another, and particularly avoid breaking in the case of glass or plastic milk bottles.

An equally important object of the invention is to provide a case so constructed that it may be used in connection with ordinary conveyor systems and bottling and sanitizing equipment without extensive modification of such apparatus in order that the containers may be automatically and continuously fed into or removed from the case.

In the accompanying drawings I have illustrated several of the many forms which the invention may take. The invention will be described in connection with glass bottles notably milk bottles, for purposes of illustration. It is to be understood that the case may be made of metal, wood, plastics or combinations of these materials and the invention may be applied to many conventional cases by modifying the same to include the provision of movably mounted partitions and by eliminating an appropriate side or end of the conventional case.

Referring to the drawings,

Figure 1 is a perspective view of a rectangular case embodying one form of the invention wherein the case is open at one side for receiving and discharging containers.

Figure 1a is a sectional detail of a latch mechanism,

Figure 3:
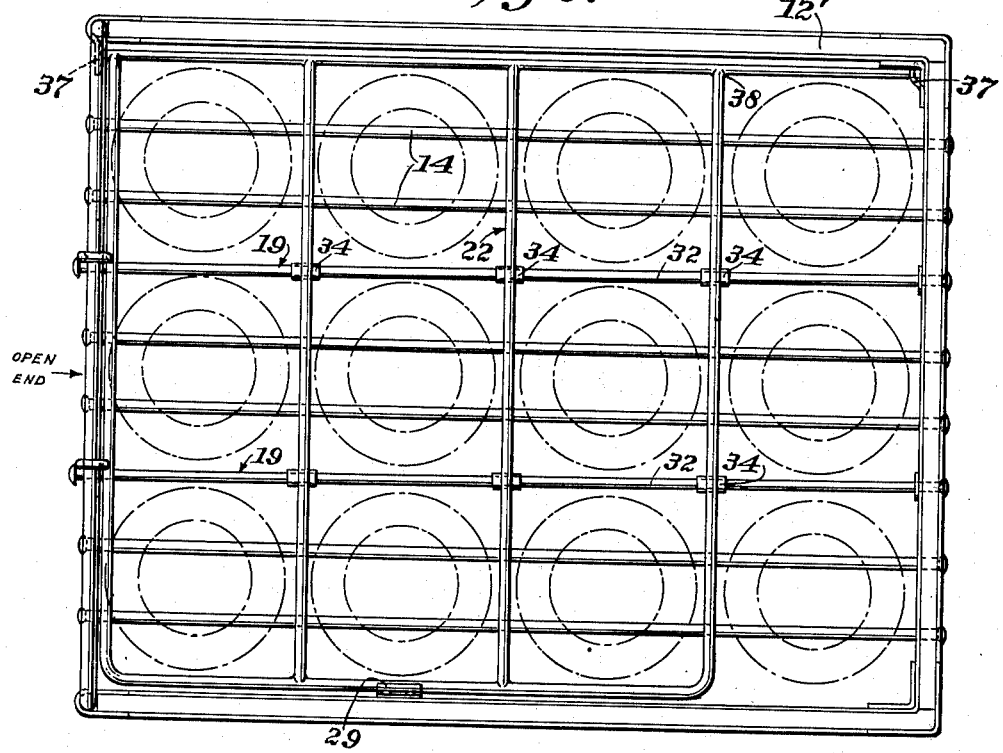
Figure 4:
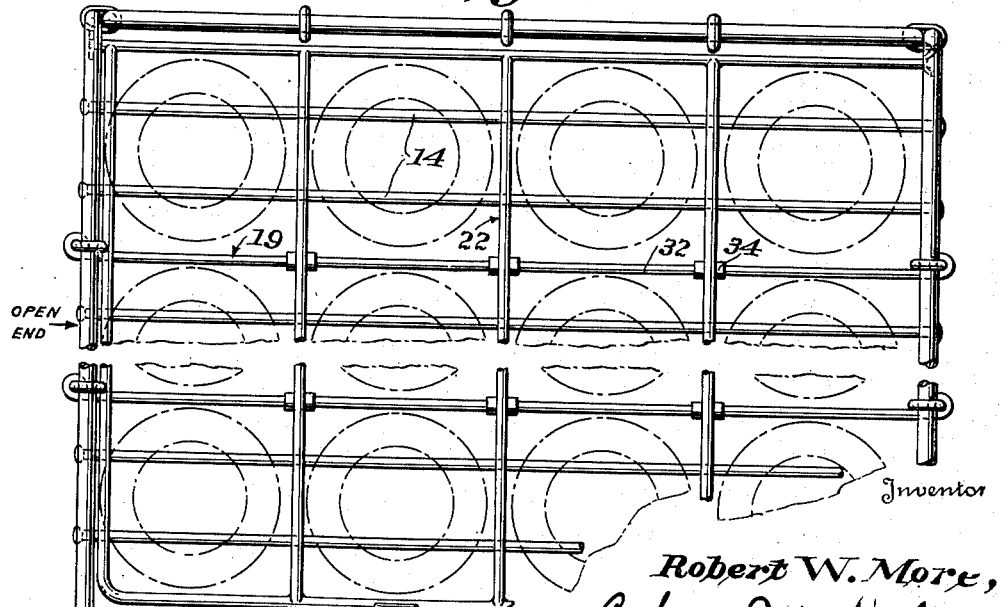

Figure 1b is a fragmentary view showing in detail the means for locking the partition structure in Figure 1 in its raised position, Figure 1c is a fragmentary view showing in detail means for locking the partition structure of Figure 1 in its raised position, the means being disposed on an upper cross-bar or frame member at the open wall portion of the case, Figure 1d is a detail view showing one of the bars forming the bottom of the case terminating flush with the lower frame member at the open wall portion of the case, Figure 1e is a similar view showing an inwardly inclined connection between one of the bars forming the bottom of the case and the lower frame member at the open wall portion of the case, Figure 2 is a sectional view of a case such as shown in Figure 1, but wherein the case is open at one end, Figure 3 is a top plan view of the case shown in Figure 2, Figure 4 is a similar top plan view to Figure 3 but wherein the walls of the case are constructed of open metal or open wood work, Figure 4a is a fragmentary elevation of a wall of the case shown in Figure 4, Figure 5 is a fragmentary sectional view showing in detail a modified form of a movable partition member, Figure 6 is a fragmentary elevation taken at right angles to Figure 5 and showing in detail a modified form of fixed partition and its association with the movable partition member of Figure 5, Figure 7 is an elevation of another type of movable partition member, Figure 8 is a section on the line 8—8 of Figure 7, Figure 9 is a side elevation showing a plurality of cases disposed in vertical nested relation, Figure 10 is a schematic top plan view of one form of apparatus for feeding containers into a case, Figure 11 is a side elevation partly in section of the construction shown in Figure 10 and showing means for moving the movable partition member into operative position and locking it after a case has been filled, Figure 12 is a side elevation of a case showing means at the bottom thereof for positioning the case in registered relation to a container feeding means, Figure 13 is a top plan view of a case showing means at the side to assure the case being disposed in proper registered relation with the container feeding means, Figure 14 is a front elevation of a modified form of case in which the partition member or separator is slidably disposed in the case, Figure 15 is a top plan view partly broken away of the case of Figure 14, Figure 16 is a front elevation of another modification in which the partition member is also slidably mounted, Figure 17 is a fragmentary detail view showing the means for guiding the partition member in its sliding movement, Figure 18 is a fragmentary detail view showing one means for holding the partition structure in its upper position, Figure 19 is a fragmentary view of an open type partition member provided with eyelets for slidably engaging the guides in the cases of Figures 14 and 16, and Figure 20 is a schematic top plan view of one form of apparatus for removing containers from a case.

Referring to Figure 1 of the drawing, the rectangular case is indicated as a whole at 10 and has end walls 11 and a side wall 12. The bottom 13 is composed of spaced slats or cylindrical rods 14 to produce a minimum of resistance to the sliding movement of the bottoms of containers such as milk bottles 15 thereover. One side is open as shown at 16 and is defined by the end walls 11 and the upper and lower frame members 17 and 18 connected at their ends to the end walls, as shown. The fixed partitions are indicated at 19 and extend transversely from the side 12 to the open side 16 to form elongated compartments 20. These partitions extend vertically upward from the bottom a distance dependent on the type, size and shape of the containers. In the present case for milk bottles, the partitions extend upward a distance to comprehend substantially the bodies of the bottles, as shown. It is preferable to employ the upper and lower frame members 17 and 18 at the open side and also to employ spaced vertical struts or rods 21 which are in registering relation with the ends of the fixed partitions 19 at the open side. The fixed partitions may be of any suitable construction so long as they provide a light and strong support and they may be connected to the side wall 12 in any suitable manner. The rods 14 constituting the bottom of the container may be connected to the lower frame member 18 in any suitable manner but are preferably so disposed with respect to the frame member, and the frame member and rods are so constructed, as to provide a minimum of obstruction to the sliding movement of containers into and from the cases as shown in Figures 1d and 1e.

In Figure 1d, the rods 14 are connected with the lower frame member 18 in a manner to be substantially flush therewith. Thus the frame member 18 is provided with spaced slots 18' in its upper portion, which slots are of a depth to receive the rods 14 and form a flush connection when the rods and frame member are soldered or welded together.

In Figure 1e, the ends of the rods 14 are reduced and received in openings in the lower frame member. The upper frame member has its upper surface inclined inwardly as shown, and when the rods and frame member are connected as by welding or soldering, an inwardly inclined surface 14''' is provided, which acts as a means to resist lateral displacement of articles in the case.

The movable partition member is indicated as a whole at 22 and consists of a frame which is rectangular in form. This frame is constructed of a plurality of spaced longitudinally extending rods or slats 24 in parallel relation and connected at their ends by cross members 25. The spaces between the rods 24 are sufficient to allow the containers to be freely removed from the top of the case by delivery personnel. One of the end members 25 is suitably pivoted to the adjacent end of the case, as shown at 26, whereby the movable partition member may be raised to clear the compartments 20 as shown in Figure 11, and lowered to rest on the vertical partitions which extend transversely substantially at right angles to the longitudinally extending rods 24 to form therewith individual bottle compartments. This pivotal connection may take various forms but preferably a resilient metal bracket member 27 attached to the end wall of the case is employed as one pivotal support, and has an inwardly bent portion or knob 28 as shown in Figure 1b.

Instead of the holding means 28, a holding means may be disposed on the inside of the upper frame member 17 as shown at 17' in Figure 1c. The spring metal device 17' will permit the movable partition member 22 to be swung upwardly and held in its raised position as shown in Figure 11. Instead of the locking means shown in Figures 1b and 1c, a locking means as shown in Figure 1a may be employed. The locking or holding means may be omitted, since the movable partition member 22 when moved rearwardly of the pivot 26 will be off-center and its free end will extend sufficiently back of the pivot to assure that the movable partition member will remain in its raised position, as shown in Figure 12.

When the movable partition member is moved upwardly out of its compartment-forming position to produce the unobstructed elongated compartments 20, an end rod 24 will engage and slip past the knob 28 or spring device 17' so as to hold the movable partition member in off-center relation with respect to its pivotal axis. With the movable partition member in its raised position, bottles may be fed into or removed from the elongated compartments 20 though the open side 16. The latch construction or knob 28 may take any suitable form which will permit the movable partition member to be readily locked in its raised position and subsequently easily released so that it may resume its intersecting relation with the fixed partitions to form the individual compartments of the case. The movable partition member is locked in its compartment-forming position against upward movement by means of one or more suitable flexible or resilient members 29 disposed on the opposite end wall of the case. These members 29 are made of spring metal and have a locking recess 30 for receiving the adjacent end cross member 25 of movable partition member 22. In order to lock the movable partition member in its compartment-forming position with the frame resting on the upper edges of the respective fixed partitions 19, as shown at 31, it is simply necessary to press the frame member 25 into the recess 30 of the locking means 29 or the frame member will interlock when it drops by gravity and engages the locking means 29. The movable partition member 22 may be readily raised by pulling upwardly upon the same.

As stated above, the case may be constructed in any suitable manner according to the practice of a particular box maker. It is preferable, however, that the vertically extending spaced fixed partitions 19 be connected to the side wall 12 and to the bottom 13 to provide the required strength and rigidity and, since these partitions separate one row of bottles from another, it is desirable that the transversely extending partition rods 32 and flat base partition members 33 comprehend a substantial area vertically of the body of the container, as shown. In this manner, the movable partition member 22 can be used without fear that the bottles will contact with each other to produce breakage or excessive noise. As shown, the rods 32 are connected at their ends to the side wall 12 and are supported by vertically spaced uprights 34 which, in turn, are connected to the flat base members 33, the latter being connected to the side wall 12 by integral brackets 35 at one end and having their opposite ends supported upon the lower frame member 18, as shown at 36. In this connection the vertical spaced standards or struts 21 are preferably welded to the upper and lower frame members 17 and 18 and the flat base members 33 are welded to the vertical standards 21 as well as to the lower frame member 18. The vertical supports 34 are secured as by welding to the flat members 33 at their lower ends and rigidly embrace the cross-bars 32 at their intermediate and upper points, i. e., the intermediate cross-bars pass through the vertical supports 34 which latter at their upper ends, are bent over to embrace the upper cross-bars as shown.

The construction just described in connection with Figure 1 is illustrative of the principal features of the invention, namely, a case having an opening 16 in its wall portion, spaced fixed partitions 19 forming elongated compartments with each other and the end walls 11 and 12, the compartments opening into the wall opening 16, and a pivotally mounted partition member 22 which, in its operative position, forms compartments with said fixed partitions, and in its raised position, allows containers to be introduced into the case or removed therefrom at the wall opening. As explained, the movable partition member 22 in its raised position is disposed in off-centered relation to its pivotal axis and may be positively held by the knob 28 or holding means 17', and in its compartment-forming position, is locked by the flexible or resilient members 29 so that it rests upon the upper rods 32 of the fixed partition members. Containers may be removed from the top of the case, but otherwise the containers are held against movement as well as contact with each other so that there is a minimum of breakage and also of noise.

The case shown in Figure 2 is substantially similar to that shown in Figure 1 with the exception that instead of having one side open, one of the ends 11' is made the opening portion for introducing and removing containers. Referring to Figure 3, when such a construction is used, the fixed partitions 19 extend longitudinally of the case and the partitions of the movable partition member 22 extend transversely. The movable partition member is pivoted to one side 12', as shown at 37, and the frame will include one less partition member 24, as shown at 38, since the fixed partitions 19 will form the bottle compartments with the adjacent end wall of the case and without the necessity of extending the frame so that it comprehends the entire interior of the case.

Referring to Figures 4 and 4a the construction is identical with that shown in Figures 2 and 3 except that instead of having the end and side walls solid, these walls are formed by intersecting metal rods or wooden slats so that they are of open work construction. This makes a lighter case which, however, is equally rigid, and while I prefer intersecting metal rods or bands, any material of open mesh construction and hence of suitable lightness may be used for the side and end walls.

Referring to Figure 5 the rods 24 of the movable partition member 22 have a bottle conforming configuration in the form of downwardly curved portions 40, as shown, to provide for protecting the bottles against contact with each other at the tops of their body portions. Otherwise, the construction illustrated may be of the character shown and described in connection with Figures 1 to 4. It will be noted that the rods 24 are provided with upwardly bent portions 41 on each side of the curved portions 40 which in the compartment-forming position of the movable partition member, form recesses for receiving the upper rods 32 of the fixed partitions 19, as shown, whereby the partition member is supported.

Referring to Figure 6 the rods 32 of the fixed partitions have a body configuration similar to that shown at 40 in Figure 5, and the rods 24 of the movable partition member 22 may have either the straight configuration shown in Figures 1 to 4 or also as shown in Figure 5. When the rods of the hinged frame rest on the fixed partitions in compartment-forming relation, they are disposed in recesses 42 in the configuration portions 40 of the rods 32 of the fixed partitions, as shown.

Referring to Figure 7, instead of using a frame, as shown in Figures 1 to 6, the pivotally mounted partition member is in the form of a plate 43 having elongated openings therein indicated at 44. The plate may be used with the case shown in Figure 1 or the cases shown in Figures 2, 3 and 4 and has been illustrated with a case in which the end is open, since it is not necessary in such construction to have the plate extend over substantially the entire interior area of the case. That is, the adjacent side and end walls of the case, and the adjacent edge of the plate 43 or cross member 38 in the open frame of movable partition member 22 of Figures 2, 3 and 4, form individual compartments with the fixed partitions, as shown. The openings 44 extend at right angles to the elongated compartments 20 and the openings are of the size to permit bottles to be removed from the top of the case.

In Figure 9, a plurality of cases are disposed in vertical nested position by providing suitable projections 45, shown in Figure 5, on the upper rim of a case which are received within and have a somewhat snug fit with the bottom edge portions of adjacent walls of a superimposed case. In the present instance this projection 45 is an extension of a metal corner angle 46 and fits in the corresponding corner angle of the superimposed case.

In Figures 10 and 11, I show schematically the cases described herein utilized with automatic machinery.

A conveyor 50 carries a plurality of cases 10 past the bottle feeding instrumentality 51 of a bottling machine 52. In this position, the hinged movable partition members 22, 43 (or slidable member 75 of Figures 14 to 16) are in raised position, as in Figure 11. The members 22 and 43 may be positively held raised by the locking knob 28 or the member 17' in off-centered relation to the pivotal axes. Instead of positive locking means, the movable partition members may be freely supported in off-centered relation with respect to their pivotal connections, as in Figure 12. In this position, the open side or end 16 of the case faces the feeding instrumentality 51, and the elongated compartments 20 are clear to receive containers introduced through the open side. The bottles are slid over the rods 14 of the bottom of the case as the desired number of containers are pushed or fed into each elongated compartment by the feeding instrumentality.

In Figure 10 I have shown an open end case, as illustrated in Figures 3 and 4 receiving simultaneously containers in each of the three elongated compartments from the feeding instrumentality 51, and it will be noted that the elongated compartments are registered with the passageways 53 of the feeding instrumentality, so that bottles are travelled from the bottling machine through the feeding instrumentality and continuously into the elongated compartments 20 of the case. If desired, one elongated compartment at a time may be filled, but it is preferred to fill as many compartments simultaneously as possible in the interest of an expedited operation.

After a case has been filled, as shown in Figure 11, it is moved to the right where a mechanism is provided for moving the movable partition member 22 to its closed or operative compartment-forming position. This mechanism includes for purposes of illustration a rotating disk 54 to which is eccentrically connected a lever 55 which, in turn, is connected to one arm 56 of a bell crank lever, the other arm 57 of which forms a partition closing member 59. As the case moves to the right, the movable partition member 22 in its raised position is engaged by the bifurcated end 60 of the closing member 59 which operates to move the partition downwardly over the bottles and lock it in its compartment-forming position, as shown in Figures 1 to 6 and Figures 10 to 11 whereupon the closing member 59 is again raised, as shown in broken lines, to engage the raised partition of the next case and perform a similar operation. In this manner, cases may be substantially continuously filled by means of the intermittent operation of the conveyor. The feeding instrumentality 51 may be intermittently operated or continuously operated since, in the latter case, either the feeder may be controlled to deliver 12 bottles as a group followed by a dwell in the operation of the feeder, or the feeder may continuously operate since the only effect upon the bottles, when the cases move past those which have not been introduced and are ready for filling into the next case, is a gentle rolling contact which will not be injurious to the bottles or the cases.

Referring to Figure 12, I have shown the case 10 at the bottom thereof, adjacent one side, provided with a bar 65 having recesses 66 for receiving one end of a registering member 67 adapted to be reciprocated by a cam 68. With this construction, the conveyor may be continuously operated, the cam 68 being timed so as to introduce the registering member 67 into the recess 66 when the case reaches the feeding position, shown in Figure 10. At this point, the case will be held fixed in register with the feeding instrumentality while the conveyor continues to move, and upon completion of the cam motion, which may be timed for the introduction of containers into a single compartment or a plurality of compartments simultaneously, the register member is withdrawn from the recess whereupon the case moves to the next feeding position or completely away from the feeding instrumentality and a similar registering operation is carried out with respect to the succeeding cases.

In Figure 13 a somewhat similar construction is provided except that the projections or stops are formed in the side wall of the case to register the elongated compartments with the feeding instrumentality. The stops are indicated at 69 but otherwise the registering means is similar to that shown in Figure 12. As the conveyor moves in the direction of the arrow, the registering member 67, at a suitable time, engages the stops to register an elongated compartment or compartments 20 with the feeding instrumentality 51.

The registry mechanism has been schematically illustrated and any suitable arrangement which will permit the conveyor to continuously operate while restraining the cases in registered filling position may be employed.

Referring further to Figures 10 to 13, and to Figure 20, construction of the type there illustrated may be utilized for automatically and continuously discharging empties or returns to a washing or sterilizing equipment. Thus, referring now to Figure 20, cases may travel on a conveyor 50' similar to conveyor 50 with the partitioning and restraining means of each case already lifted out of the way of the containers therein. A suitable container receiving instrumentality such as laterally extending conveyor 96 may be provided for receiving the empties and suitable padded reciprocating plungers 94 may be employed to push the bottles out of the cases at the discharge point and onto the conveyor 96, such plungers operating by moving through the opposite wall of cases such as shown and described in connection with Figure 4 in timed relation and under control of a suitable cam mechanism. The cam mechanism may comprise an eccentric cam device 90 having a cam follower means 91 operating in a groove in cam 90 for actuating an arm 92 coupled with the plungers 94 as shown. The operation of the cam 90 may be co-ordinated by any suitable means with the movement of the conveyor 50' as is indicated by the legend in Figure 20.

The cases described above have been shown as containing one dozen bottles, but cases may be constructed to receive more or less than this number. While it is preferred to have the movable partition member 22 mounted for pivotal movement within the case, i. e., hingedly mounted intermediate the side or end wall thereof, as shown, in some cases, the movable partition member may be mounted adjacent the upper end of the case as where the fixed partitions extend throughout the depth of the case. Under such circumstances the movable partition member will be pivoted on the upper edge of the case with the partition member locking means located on the opposite upper edge.

The particular construction of the case per se may be varied as indicated above, and it will be observed that the present invention is of such simplicity that it may be readily applied to any number of types of standard milk bottle, beverage bottle and other container carrying cases with but little and inexpensive modification thereof.

Numerous changes may be made in the form of the partitions which are fixed to the case as well as the form of the movable partition member, for instance, as indicated in Figures 5 and 7 without departing from the spirit of this invention wherein the fixed partitions extend either transversely of the case and the intersecting movable partitions resting on the fixed partitions extend longitudinally of the case as in Figure 1 or, the fixed partitions extend longitudinally of the case and the movable partitions extend transversely, as shown in Figures 3 and 4. A construction as shown in Figures 3 and 4 is preferred.

Referring to Figure 14, the case is provided with a vertically sliding partition or separator 75. This construction may be used with any of the forms of cases heretofore described instead of the hinged partition member 22. In the construction of Figure 14, suitable vertically arranged guide rods 76 are fixed to the wall of the case, as shown in Figure 17, preferably at or adjacent the corner portions and extend from the top of the case to a point intermediate the walls thereof, i. e., to a point where the partition member or separator may, if desired, rest on the upper bars 32 of the fixed partitions. Suitable locking means 77, such as shown in Figure 1a or Figure 18, are positioned at the top of the case to hold the partition in its raised position to permit introduction and removal of containers and other objects through the open wall portion. Similar holding means 77' may be positioned at any desired position intermediate the walls of the case to hold the partition member in operative position, as shown in Figure 14.

In using this construction the movable partition member is manually slid vertically on the guides to its several positions and it will be noted that stops 78 and 78' are provided for limiting the upward and downward movement of the partition member.

As explained above, the case shown in Figure 14 is identical in all respects with any of the cases shown in Figures 1 to 9 and 12 and 13 and it will be filled with or depleted of containers, as shown in Figures 10 and 11, except insofar as the operation of the hinged member is concerned.

In Figure 15, I have shown a partition member in the form of a metal plate 79 having circular openings 80. This plate is an integral structure as distinguished from the partition members shown in Figures 1 to 6 and is similar to the plate member of Figures 7 and 8 except that the openings 80 are circular. The openings 80 are of a dimension larger than the largest diameter or cross section of the object or container carried in the case so that the same may be manually lifted from the top of the case.

This plate member is slidably disposed on the guides 76 as described above, having suitable openings 81 to permit vertical sliding movement. In this connection where open frame members 22 are employed, as in Figures 1 to 4, they are provided with suitable eyelets 82, as shown in Figure 19, to receive the guides 76 for sliding movement thereon.

The partition members whether of the open type, as shown at 22 in Figures 1 to 4, or plate members, as shown in Figures 7, 8 and 15, may be of an area substantially equal to the area of the case or of less area, as shown in Figures 3, 4 and 7, dependent on the arrangement of fixed partitions and the open wall portion of the case, as described hereinabove.

While I have shown the guides 76 as riveted or provided with a mashed-down head at 83 in Figure 17, whereby the guides and partition members are permanently fixed to the case, the guides 76 may be detachably mounted on the case in a variety of ways, e. g., by having the ends 84 which extend through the case wall threaded to receive a nut (not shown) or provided with an opening to receive a cotterpin (also not shown). Any suitable means which will hold the guides rigidly in position may be used.

Referring to Figure 16, the guides 76 extend from top to bottom of the cases. This construction is similar to that set forth in connection with Figure 14 except that the fixed partitions are of reduced vertical dimension. This is, the elongated compartments are defined by transversely extending spaced bottom members in the form of cylindrical rods or slats 85 which are of greater diameter or cross-section than the bottom members 14' and aligned with the vertical struts 21, as shown, thereby forming with the intermediate bottom members 14' elongated compartments 20. This fixed partition construction is useful with all of the other cases described herein, and the members 85 may be of relatively greater dimension than shown to accommodate various objects and containers, e. g., may extend vertically to any required distance. Holding means 77 and 77' are provided in the case of Figure 16 as in the case of Figure 14 but intermediate stops 78' are eliminated.

In Figure 16, I have shown at 86 a pair of handles or lifting rods connected to the member 75. These lifting rods may be used to slide the partition member on the guides 76. They are made of thin metal and are particularly useful with the structure of Figure 16 where it may be desirable to rest the partition member in the bottom of the case when it is not being used.

The transversely extending slats or rods 14, 14' and 85 forming the bottom of the case always extend in a direction toward the open wall portion 16 of the case, as shown in Figure 1.

Referring to Figures 1 and 1c, the resilient holding means 17' may be disposed on the side wall 12 or the end wall in Figure 2, or on both a wall and the upper frame member 17. This resilient holding means 17' may be of any desired form which will allow the frame member to pass back and forth over the same.

Referring to Figures 10 and 11, Figures 12 and and 13 and Figures 14 to 16, the procedure for filling or emptying cases having a sliding separator 75 will be similar to that described in that the separator will be lifted manually or automatically mechanically to allow objects to be introduced or removed from the cases and thereafter, the separator is released either manually or automatically mechanically and allowed to fall by gravity to compartment forming position or automatically pushed down by gravity to this position.

While the invention has been illustrated in connection with milk bottles having a cylindrical configuration, it is to be understood, of course, that the case may be employed with milk bottles having an angular or squared configuration. In fact, the case may be employed in connection with containers as well as other portable objects having varying sizes and shapes, as stated above.

I claim:

1. An apparatus of the class described comprising a conveyor, cases thereon each having an open wall portion and a movably mounted partition member secured to the wall of the case, said movably mounted member in one position forming individual compartments and in another position, allowing objects to be introduced to or discharged from the open wall portion of the case, an object feeding instrumentality, said cases being carried by the conveyor with the open wall portion facing said feeding instrumentality and with the partition member in a position to allow objects to be introduced through said open wall portion, and means for moving said partition member to its compartment-forming position within the case after the case has been filled.

2. An apparatus of the class described comprising a conveyor, cases thereon each having an open wall portion, a movably mounted partition member secured to the wall of the case, said movably mounted member in one position, forming individual compartments and in another position, allowing objects to be introduced to or discharged from the open wall portion of the case, and means for supporting the partition member in either of said positions, said partition member upon release from the second-named position moving by gravity to the compartment-forming position, an object feeding instrumentality, said cases being carried by the conveyor with the open wall portion facing said feeding instrumentality and with the partition member in a position to allow objects to be fed through said open wall portion, and means for releasing said partition member from its aforesaid feeding position whereby the partition member may fall by gravity to its compartment-forming position within the case after the case has been filled.

3. An apparatus of the class described comprising a conveyor, cases thereon each having an open wall portion and a movably mounted partition member secured to the wall of the case, said movably mounted member in one position forming individual compartments and in another position, allowing objects to be introduced to or discharged from the open wall portion of the case, an object receiving instrumentality, said cases being carried by the conveyor with the open wall portion facing said receiving instrumentality and with the partition member in a position to allow objects to be removed through said open wall portion, and means for removing objects from said case through said open wall portion to said receiving instrumentality.

4. The method of filling cases each having an open wall portion and a movably mounted partition member secured to the wall of the case, said movably mounted member in one position, forming individual compartments and in another position, allowing objects to be introduced to or discharged from the open wall portion of the case, which comprises conveying a case to an object feeding instrumentality with the open wall portion facing the same and with the partition member in its last-named position, feeding objects through said open wall portion into the case and thereafter moving said partition member to compartment-forming position within the case while being carried by said conveyor at a point removed from the feeding instrumentality.

5. The method of discharging objects from cases each having an open wall portion and a movably mounted partition member secured to the wall of the case, said movably mounted member in one position forming individual compartments and in another position, allowing objects to be introduced to or discharged from the open wall portion of the case, which comprises conveying a case to an object receiving instrumentality with the open wall portion facing the same and with the partition member in its last-named discharging position, removing objects from the case through said open wall portion to the receiving instrumentality, and thereafter moving said partition member to compartment-forming position within the case while being carried by said conveyor at a point removed from the feeding instrumentality.

6. An apparatus of the class described comprising a conveyor, cases thereon each having an open wall portion and a movably mounted partition member secured to the wall of the case, said movably mounted member in one position forming individual compartments and in another position, allowing objects to be introduced to or discharged from the open wall portion of the case, an object receiving instrumentality, said cases being carried by the conveyor with the open wall portion facing said receiving instrumentality and with the partition member in a position to allow objects to be removed through said open wall portion, means for removing objects from said case through said open wall portion to said receiving instrumentality, an object feeding instrumentality, said cases being carried by the conveyor with the open wall portion facing said feeding instrumentality and with the partition member in a position to allow objects to be introduced through said open wall portion, and means for moving said partition member to its compartment-forming position within the case after the case has been filled.

7. A container case of the type described comprising, a base wall of rectangular shape, four side walls upstanding from the base wall, at least one of the side walls having openings therein extending from the base wall to substantially the top thereof to permit insertion of containers therethrough into the case in upright position, guide means extending between the side wall having openings and the opposite wall for guiding and retaining the containers in aligned rows, partitioning and retaining means extending substantially throughout the horizontal cross sectional area of the case intermediate the top and base of the case, said last named means being movably supported in means on at least one side wall, said partitioning and retaining means having openings therein at least partially defined by retainer members extending at right angles to the said guide means, the arrangement being such that containers may be inserted or removed from the case through the side thereof with the rack means in a first position, and may be retained in the case with the rack means in a second position.

ROBERT W. MORE.

REFERENCES CITED

The following references are of record in the file of this patent:

UNITED STATES PATENTS

| Number | Name | Date |
| --- | --- | --- |
| 630,903 | Leidich | Aug. 15, 1899 |
| 771,140 | Galer | Sept. 27, 1904 |
| 942,966 | Kruse | Dec. 14, 1909 |
| 975,962 | Kruse | Nov. 15, 1910 |
| 1,078,262 | Dawson | Nov. 11, 1913 |
| 1,110,250 | Dalgleish | Sept. 8, 1914 |
| 1,131,728 | Nagle | Mar. 16, 1915 |
| 1,253,748 | Tyson | Jan. 15, 1918 |
| 2,013,555 | Deeron | Sept. 3, 1935 |
| 2,069,926 | Read | Feb. 9, 1937 |
| 2,179,648 | Thayer | Nov. 14, 1939 |
| 2,230,394 | Young | Feb. 4, 1941 |
| 2,243,625 | Gettelman | May 27, 1941 |
| 2,254,097 | Wood | Aug. 26, 1941 |
| 2,266,225 | Mahler | Dec. 16, 1941 |
| 2,313,355 | Mordy | Mar. 9, 1943 |
| 2,345,347 | McLeod | Mar. 28, 1944 |
| 2,359,406 | Crosser | Oct. 3, 1944 |

FOREIGN PATENTS

| Number | Country | Date |
| --- | --- | --- |
| 3,126 | Denmark | May 21, 1900 |
| 4,159 | Great Britain | Feb. 20, 1906 |
| 187,102 | Germany | July 6, 1907 |
| 5,232 | Great Britain | Apr. 7, 1915 |